United States Patent
Suryanarayana et al.

(10) Patent No.: US 12,190,095 B2
(45) Date of Patent: Jan. 7, 2025

(54) CONTEXT AWARE ADAPTIVE PROTOCOL FOR MANAGING BEST KNOWN CONFIGURATION FIRMWARE

(71) Applicant: Dell Products L.P., Round Rock, TX (US)

(72) Inventors: Shekar Babu Suryanarayana, Bangalore (IN); Vivek Viswanathan Iyer, St. Johns, FL (US)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 17/877,458

(22) Filed: Jul. 29, 2022

(65) Prior Publication Data
US 2024/0036853 A1    Feb. 1, 2024

(51) Int. Cl.
G06F 8/65    (2018.01)
(52) U.S. Cl.
CPC ..................... G06F 8/65 (2013.01)
(58) Field of Classification Search
CPC ....................................................... G06F 8/65
See application file for complete search history.

(56) References Cited

U.S. PATENT DOCUMENTS

| | | | |
|---|---|---|---|
| 2010/0214603 A1* | 8/2010 | Tamura | H04N 1/00912 358/1.15 |
| 2020/0310788 A1* | 10/2020 | Zimmer | G06F 8/654 |
| 2020/0326930 A1* | 10/2020 | Suryanarayana | G06F 8/65 |
| 2021/0240589 A1* | 8/2021 | Samuel | G06F 8/65 |

* cited by examiner

Primary Examiner — Phillip H Nguyen
(74) Attorney, Agent, or Firm — Jackson Walker L.L.P.

(57) ABSTRACT

In one aspect, a disclosed method includes learning one or more chip agnostic parameters across a plurality of best known configuration (BKC) firmware versions, performing BKC attributes tuning based on said learning, implementing platform specific BKC table offsets and a handoff block to pass the table offsets to update routines by creating a trusted session for platform firmware table updates, and dynamically publishing changes in BKC policy. A BKC firmware serialization protocol may be implemented to ensure gaps in firmware versions at an end user platform are resolved by synchronizing each BKC version attribute. The serialization protocol may employ node-based cloud ecosystem learning. The method may further include reloading memory map parameters for uninterrupted services. The uninterrupted services may include, as examples, user presence detection after power resume and central processing unit (CPU) power cap functions.

15 Claims, 4 Drawing Sheets

CONTEXT AWARE ADAPTIVE PROTOCOL FOR MANAGING BEST KNOWN CONFIGURATION FIRMWARE

TECHNICAL FIELD

The present disclosure relates to information handling system firmware and, more specifically, managing firmware updates.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Manufacturers and distributors of information handling system devices including, as an example, a central processing unit (CPU) may define a best known configuration (BKC) that indicates a particular version for each component of a software release associated with the device. A system update process may specify specific components of software and firmware pertaining to a specific platform. A device vendor may recommend strict compliance with a BKC table indicating the specified version for each component. In the case of a CPU, for example, the BKC table may specify a BIOS version for a platform that includes the CPU. Any non-compliance with a BKC may disturb the platform ecosystem and produce unexpected behavior. While an original equipment manufacturer (OEM) of information handling systems may be able to maintain BKC compliance for new systems, maintaining BKC compliance after a system is ready to ship (RTS) or has already been shipped (post-RTS) is generally much more challenging. For example, releasing a new version of BIOS to the field may be risky due to complexity associated with changing BKC attributes, e.g., NVRAM, CMOS, SPI flash data, dynamic point cloud data (PCD), OS or VM configurations, which may result in power on self test (POST) failures. In addition, because end users may not regularly and diligently update their systems, a BIOS version gap, i.e., a difference between the BIOS version on the customer box and BKC-compliant BIOS version, may develop.

SUMMARY

In accordance with teachings disclosed herein, common problems associated with maintaining BKC compliance post-RTS are addressed by systems and methods disclosed herein. A BKC context-aware adaptive protocol tunes BKC attributes by learning various multi-generation SoC-agnostic parameters across different BKC firmware versions. A disclosed trusted handoff session (THS) implements platform-specific BKC table offsets and passes a handoff block to update routines via a trusted session for platform firmware table updates. In addition, a runtime advisory map driver (RAMD) dynamically publishes changes in BKC policy to all OS/VM/Hypervisors and reloads the memory map parameter for uninterrupted services such, user presence detection after MS resume, CPU power cap functions, power share policy sync, without a reboot. Disclosed systems may employ a node-based cloud manageability learning method to implement a BKC firmware serialization protocol to ensure that any gaps between the customer platform firmware version and the BKC version are updated carefully to sync every major BKC version attribute and thereby avoid update failures and platform power-on failures.

In one aspect, a disclosed method includes learning one or more chip agnostic parameters across a plurality of BKC firmware versions, performing BKC attributes tuning based on said learning, implementing platform specific BKC table offsets and a handoff block to pass the table offsets to update routines by creating a trusted session for platform firmware table updates, and dynamically publishing changes in BKC policy. A BKC firmware serialization protocol may be implemented to ensure gaps in firmware versions at an end user platform are resolved by synchronizing each BKC version attribute. The serialization protocol may employ node-based cloud ecosystem learning. The method may further include reloading memory map parameters for uninterrupted services. The uninterrupted services may include, as examples, user presence detection after power resume and central processing unit (CPU) power cap functions.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
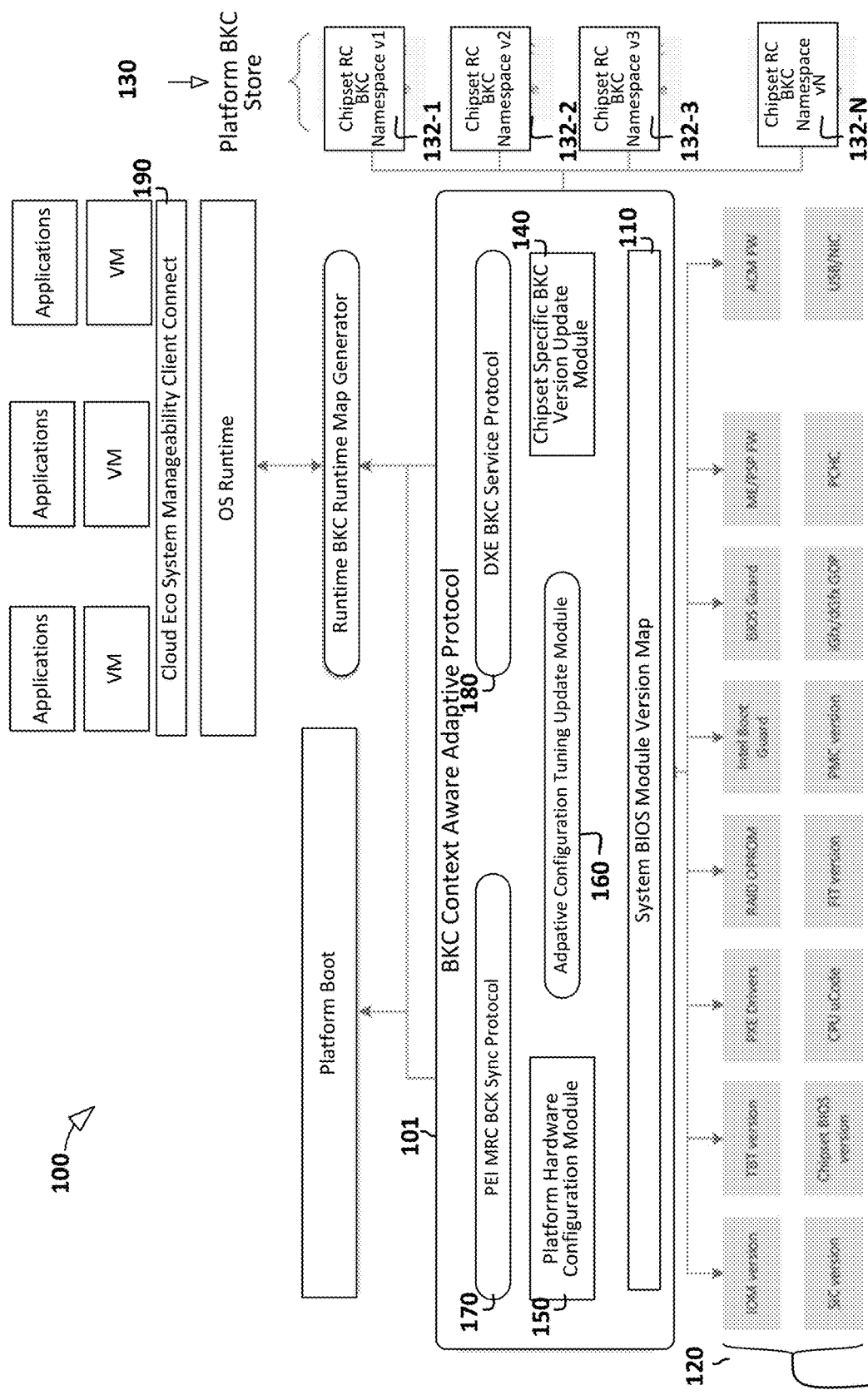
FIG. 1 illustrates elements of a context-aware adaptive protocol for BKC mapping across various BKC versions.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic.

Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an information handling platform 100 in accordance with disclosed teachings for maintaining the BKC compliance of an information handling system post-RTS. As depicted in FIG. 1, a BKC context aware adaptive protocol 101 is coupled to system firmware components 120 and a platform BKC store 130. The system firmware components 120 illustrated in FIG. 1 include information indicative of BKC version information for various firmware components including, without limitation, the firmware components explicitly depicted in FIG. 1 (IOM, SiC, TBT, chipset BIOS, PXE drivers, CPU ucode, RAID OPROM, FIT, Boot Guard, PMC, BIOS Guard, iGfx/dGfx, ME PSP firmware, PCHC, ACM firmware, USB/NIC, etc.). The illustrated platform BKC store 130 includes multiple versions of a chipset RC BKC namespace 132, including version 1 (132-1), version 2 (132-2), . . . version N (132-N). A system BIOS module version map 110 monitors system firmware components over a series of BKC attributes in platform BKC store (NVMe Namespace) 130 over a series of BKC attributes. A chipset-specific BKC version update module 140 and a platform hardware configuration module 150 generate a platform level BKC table view (not explicitly depicted in FIG. 1). The platform level BKC table view is retrieved or otherwise accessed by an adaptive configuration tuning module 160 and a final update is prepared. For a platform boot, a PEI memory reference code (MRC) BKC sync protocol 170 extracts the BKC boot parameters for a safe power on and a driver execution environment (DXE) BKC service protocol 180 ensures the Runtime BKC map by generating stable BKC at OS runtime for VM/Applications. FIG. 1 further illustrates a cloud ecosystem manageability client 190 for connecting over a manageability node for SoC-agnostic BKC preparation. The cloud export of chipset BKC namespace versions may be done based on platform BKC version updates. A multi-generation platform agnostic BKC version control provides an advisory map for pulling/pushing any BKC updates.

Figure 2:
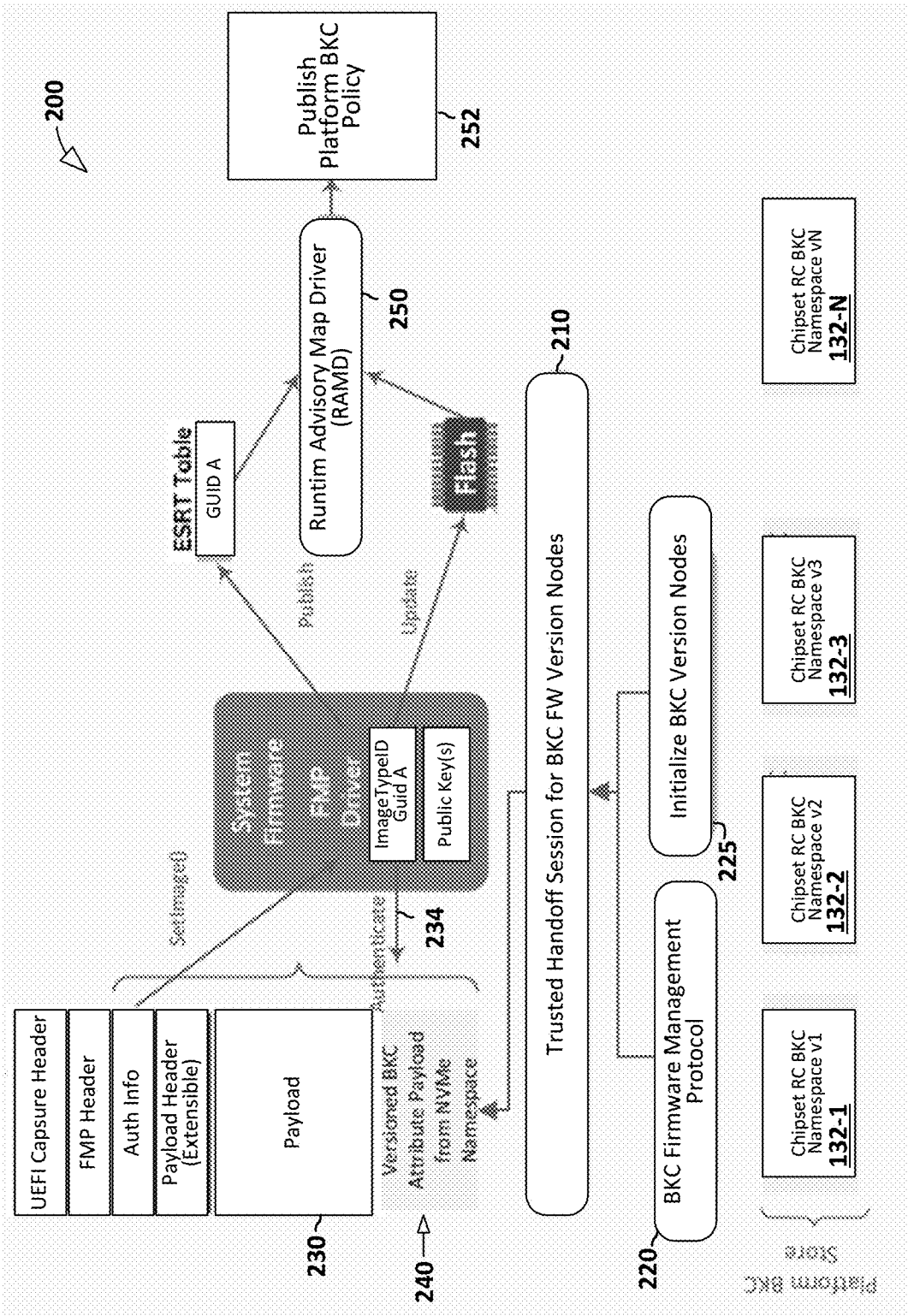
FIG. 2 illustrates elements of a trusted handoff session in accordance with disclosed teachings.

FIG. 2 illustrates an exemplary embodiment of a trusted handoff session (THS) 200 in accordance with disclosed teachings. The illustrated THS 200 implements the platform specific BKC table offsets and a handoff block to pass it to update routines by creating a trusted handoff session for platform firmware table updates (210). Each chipset BKC version parameter 132 needs a trust handoff for firmware update, that is done using a BKC firmware management protocol 220 by initializing (225) BKC version nodes as an extended payload of the actual UEFI capsule payload (230). The authentication 234 is done using native capsule authorization method. However, a trusted handoff session is created to ensure the versioned BKC attribute payload 240 is pushed for authorization at the right time before any update. Runtime Advisory Map Driver (RAMD) 250 dynamically publishes (252) the change in BKC policy to all OS/VM/Hypervisors and reloads the memory map parameter for uninterrupted services (as examples: User presence detection after MS Resume, CPU Power cap functions, Power Share Policy-2 sync, avoid DTT "blue scree of death" (BSOD), etc.) without a reboot. The platform OS stack (VM/Application) can dynamically tune the BKC parameters as the corresponding drivers are updated seamlessly, without additional platform reboots.

Figure 3:
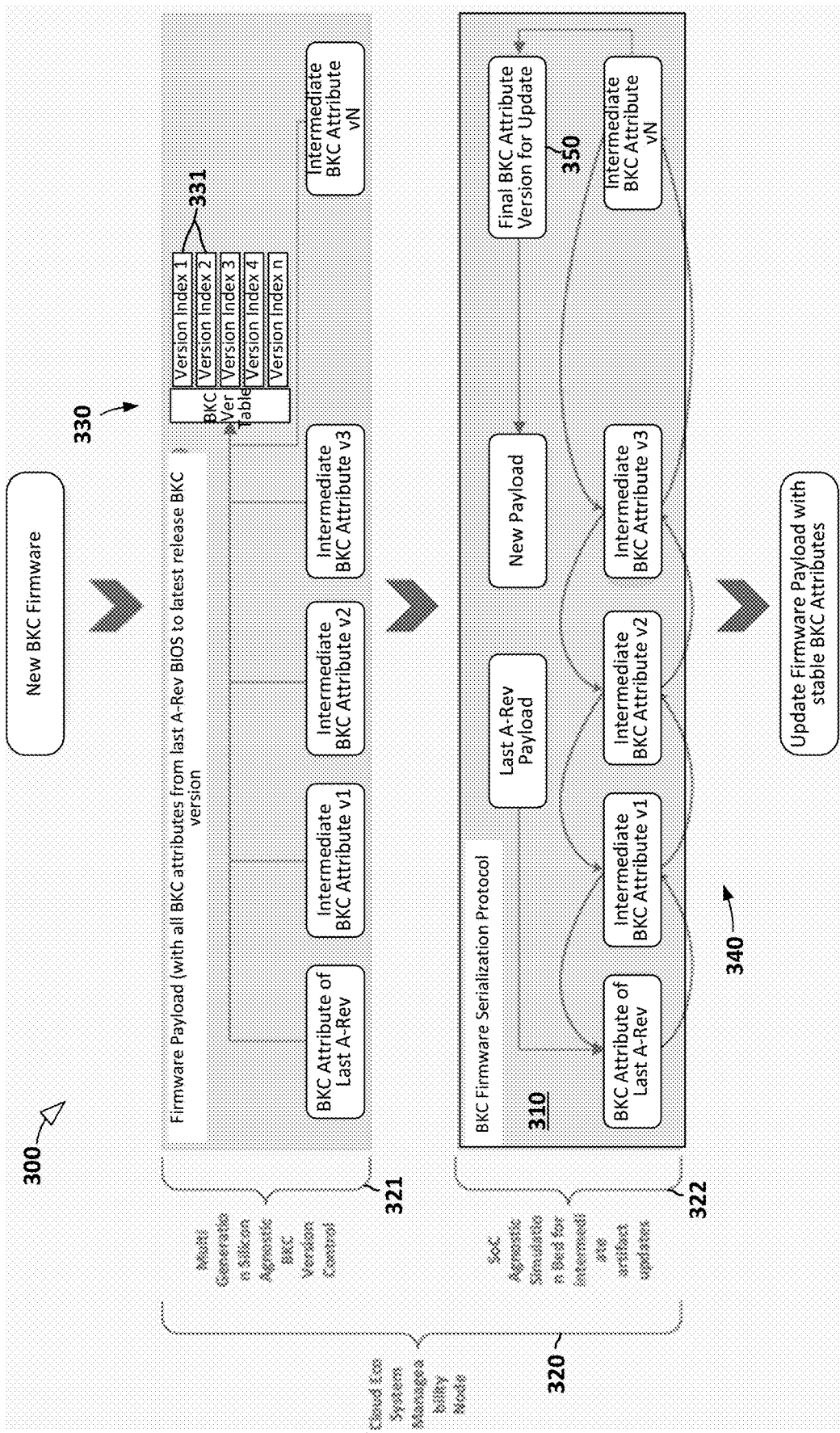
FIG. 3 illustrates elements of a BKC serialization process in accordance with disclosed teachings.

FIG. 3 illustrates a BKC serialization process 300 to prepare a feasible BKC attribute version for a stable update in accordance with disclosed teachings. The process 300 illustrated in FIG. 3 implements a BKC firmware serialization update protocol 310 to ensure that a customer platform which has experienced a long gap between firmware version updates is updated carefully to synchronize every major BKC version attribute and thereby avoid update failures and platform power-on failures.

A cloud ecosystem manageability node 320 gets the BKC firmware update request from silicon vendors. In response, a multi-generation silicon-agnostic BKC version control 321 is prepared using a versioned BKC attribute exported by the platform (client). A BKC version table 330 is generated with version indices 331 based on a previous A-Rev BIOS/BKC firmware version from customer platform. Each intermediate BKC version until the final version is taken for serialization. An SoC-agnostic simulation bed 322 takes the new payload and performs a series 340 of BKC attribute updates until a stable BIOS/BKC version 350 is generated. As the serialization process is completed, a stable BKC Firmware Version, ready for deployment on the target customer, is generated.

Figure 4:
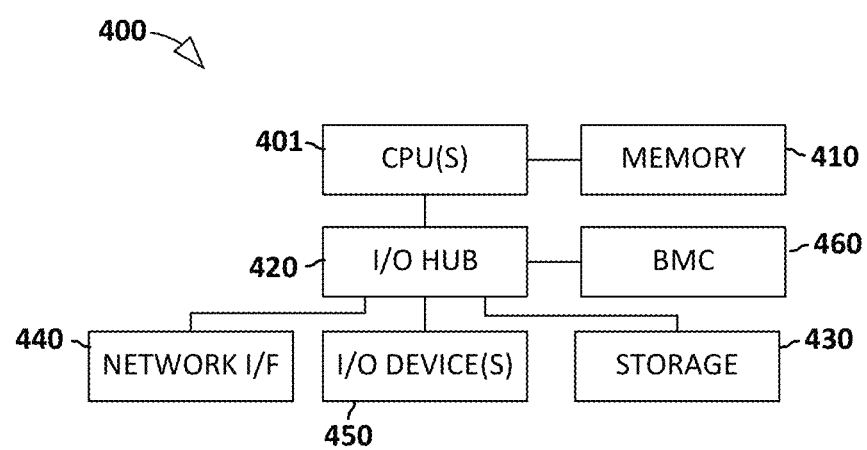
FIG. 4 illustrates an exemplary information handling system suitable for use in conjunction with features disclosed in FIG. 1 through FIG. 3.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
   learning one or more chip agnostic parameters across a plurality of best known configuration (BKC) firmware versions;
   generating a platform-specific BKC version table including one or more version entries corresponding to one or more firmware versions since a released BKC firmware version;
   performing BKC attributes tuning based on said learning and said platform-specific BKC version table;
   implementing platform specific BKC table offsets and a handoff block to pass the table offsets to update routines by creating a trusted session for platform firmware table updates; and
   dynamically publishing changes in BKC policy.

2. The method of claim 1, further comprising:
   implementing a BKC firmware serialization protocol to ensure gaps in firmware versions at an end user platform are resolved by synchronizing each BKC version attribute.

3. The method of claim 2, wherein the serialization protocol employs node-based cloud ecosystem learning.

4. The method of claim 1, further comprising:
   reloading memory map parameters for uninterrupted services.

5. The method of claim 4, wherein the uninterrupted services include one or more of: user presence detection after power resume and central processing unit (CPU) power cap functions.

6. An information handling system, comprising:
   a central processing unit (CPU); and
   a computer readable medium including processor executable instructions that, when executed by the CPU, cause the information handling system to perform operations including:
   learning one or more chip agnostic parameters across a plurality of best known configuration (BKC) firmware versions;
   generating a platform-specific BKC version table including one or more version entries corresponding to one or more firmware versions since a released BKC firmware version;

performing BKC attributes tuning based on said learning and said platform-specific BKC version table;
implementing platform specific BKC table offsets and a handoff block to pass the table offsets to update routines by creating a trusted session for platform firmware table updates; and
dynamically publishing changes in BKC policy.

7. The information handling system of claim 6, wherein the operations include:
implementing a BKC firmware serialization protocol to ensure gaps in firmware versions at an end user platform are resolved by synchronizing each BKC version attribute.

8. The information handling system of claim 7, wherein the serialization protocol employs node-based cloud ecosystem learning.

9. The information handling system of claim 6, wherein the operations include:
reloading memory map parameters for uninterrupted services.

10. The information handling system of claim 9, wherein the uninterrupted services include one or more of: user presence detection after power resume and central processing unit (CPU) power cap functions.

11. A non-transitory computer readable medium including processor executable instructions that, when executed by a processor of an information handling system, cause the system to perform operations including:
learning one or more chip agnostic parameters across a plurality of best known configuration (BKC) firmware versions;
generating a platform-specific BKC version table including one or more version entries corresponding to one or more firmware versions since a released BKC firmware version;
performing BKC attributes tuning based on said learning and said platform-specific BKC version table;
implementing platform specific BKC table offsets and a handoff block to pass the table offsets to update routines by creating a trusted session for platform firmware table updates; and
dynamically publishing changes in BKC policy.

12. The non-transitory computer readable medium of claim 11, wherein the operations include:
implementing a BKC firmware serialization protocol to ensure gaps in firmware versions at an end user platform are resolved by synchronizing each BKC version attribute.

13. The non-transitory computer readable medium of claim 12, wherein the serialization protocol employs node-based cloud ecosystem learning.

14. The non-transitory computer readable medium of claim 11, wherein the operations include:
reloading memory map parameters for uninterrupted services.

15. The non-transitory computer readable medium of claim 14, wherein the uninterrupted services include one or more of: user presence detection after power resume and central processing unit (CPU) power cap functions.

* * * * *